US 6,625,144 B1

(12) United States Patent
El-Batal et al.

(10) Patent No.: US 6,625,144 B1
(45) Date of Patent: Sep. 23, 2003

(54) DUAL-USE DB9 CONNECTOR FOR RS-232 OR DUAL-ACTIVE CONTROLLER COMMUNICATION

(75) Inventors: Mohamed H. El-Batal, Westminster, CO (US); Michael Nielson, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,677

(22) Filed: Aug. 18, 1999

Related U.S. Application Data
(60) Provisional application No. 60/096,989, filed on Aug. 18, 1998.

(51) Int. Cl.[7] ............................................. H05K 10/00
(52) U.S. Cl. ........................ 370/364; 370/465; 714/1
(58) Field of Search ................................ 370/464, 465, 370/466; 439/43, 52, 53, 365, 620; 714/1, 6–9, 47

(56) References Cited

U.S. PATENT DOCUMENTS

| 4,861,276 A | * | 8/1989 | Muller et al. ............... 439/365 |
| 5,217,394 A | * | 6/1993 | Ho .............................. 439/620 |
| 5,228,077 A | * | 7/1993 | Darbee ..................... 379/102.01 |
| 5,349,685 A | * | 9/1994 | Houlberg ..................... 712/40 |
| 5,506,750 A | * | 4/1996 | Carteau et al. ............. 361/685 |
| 6,282,584 B1 | * | 8/2001 | Garroussi et al. .............. 714/7 |

* cited by examiner

Primary Examiner—Hassan Kizou
Assistant Examiner—David Odland
(74) Attorney, Agent, or Firm—R. Michael Ananian; Arthur J. Samodovitz

(57) ABSTRACT

A circuit and special cable which allow a single DB9 connector to provide a standard RS-232 interface to a RAID controller in single RAID controller systems or to provide a controller-to-controller communication link for messaging, control and status signals when the special cable is used to interconnect two RAID controllers in a dual-active system.

20 Claims, 10 Drawing Sheets

FIG. 8

DB-9 Interface Faceplate Connector Pinout - Serial Channel A

| Pin Name | Pin # | Function |
|---|---|---|
| DCDA | 1 | Data Carrier Detect input |
| RXDA | 2 | Receive Data input |
| TXDA | 3 | Transmit Data output |
| DTRA | 4 | Data Terminal Ready output |
| GND | 5 | Ground |
| DSRA | 6 | Data Set Ready input |
| RTSA | 7 | Request To Send output |
| CTSA | 8 | Clear To Send input |
| KBL_PRES* | 9 | Cable Present input |

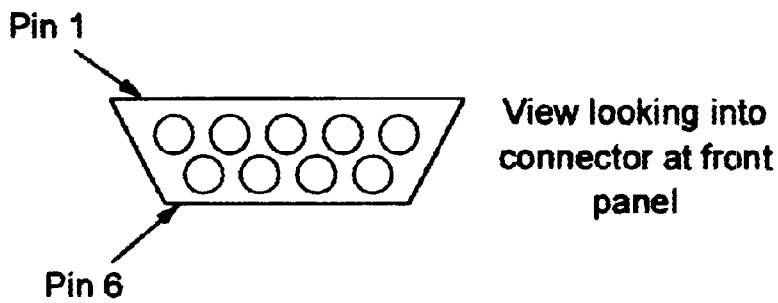

Pin 1

Pin 6

View looking into connector at front panel

FIG. 9

Diagnostic Board DB9 Terminal Interface Connector Pinout - Serial Channel A

| Pin Name | Pin # | Function |
|---|---|---|
| DCDA | 1 | Data Carrier Detect input |
| RXDA | 2 | Receive Data input |
| TXDA | 3 | Transmit Data output |
| DTRA | 4 | Data Terminal Ready output |
| GND | 5 | Ground |
| DSRA | 6 | Data Set Ready input |
| RTSA | 7 | Request To Send output |
| CTSA | 8 | Clear To Send input |
| N/C | 9 | No connection |

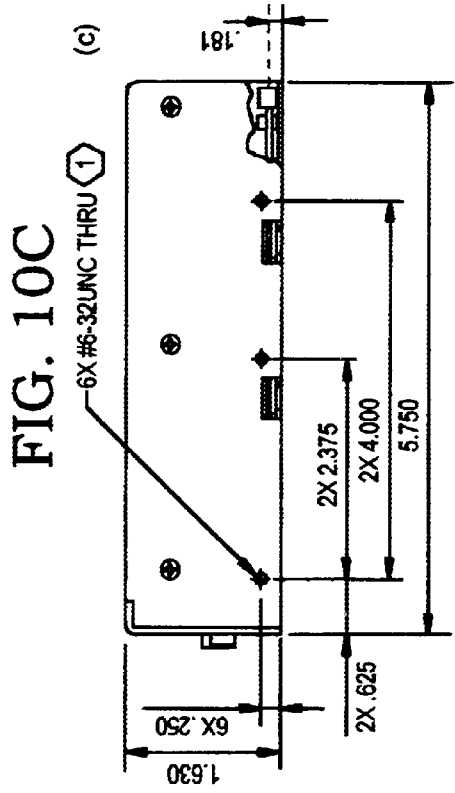
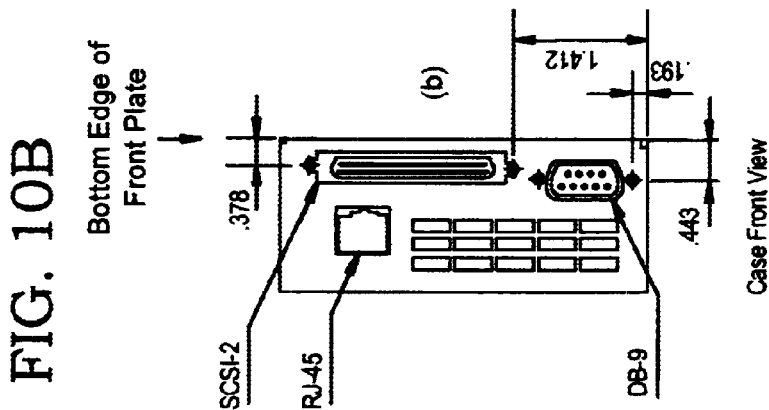
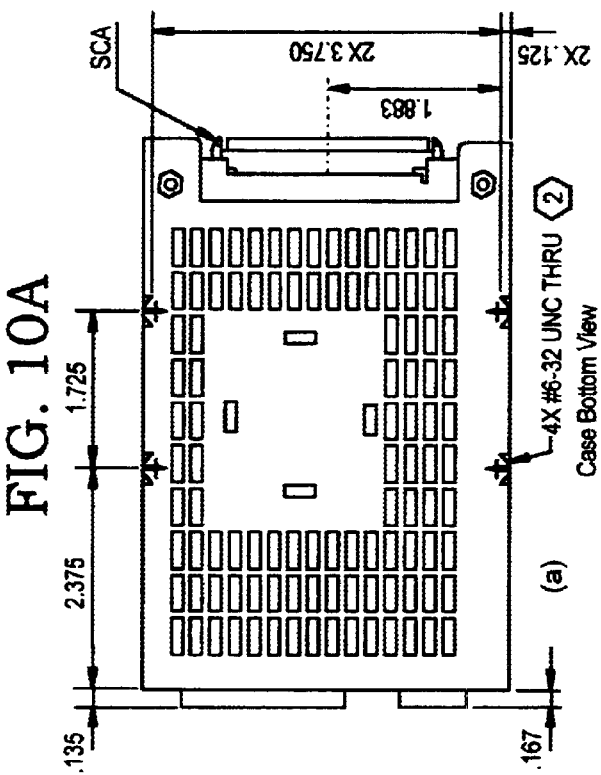
FIG. 10A
FIG. 10B
FIG. 10C
DAC960SCA/SE Package Drawing

DUAL-USE DB9 CONNECTOR FOR RS-232 OR DUAL-ACTIVE CONTROLLER COMMUNICATION

This application claims the benefit of U.S. provisional application Ser. No. 60/096,989 filed Aug. 18, 1998.

FIELD OF THE INVENTION

This invention relates generally to circuits and signal connectors supporting RS-232 communication protocol, and more particularly to a DB9 circuit and connecting cable, and signal pin mapping for supporting RS-232 communications in a disk drive controller environment.

BACKGROUND OF THE INVENTION

The computer industry is marked by rapid advancement in hardware, firmware, software, and architectures generally. Because of the widespread proliferation of computers and the need for rapid and reliable access to data, computer data storage technology is at the forefront of such changes. In order to provide rapid and reliable access to large amounts of data, for example for commercial databases, hotel or airline reservation systems, corporate records, and the like, systems of related disk drives, such as Redundant Arrays of Independent Disks (RAID) systems are frequently and increasingly used. RAID refers to Redundant Array of Independent Disks, a firmware/hardware implementation of a disk array controller in which data is stored on disks in such a manner as to improve performance and avoid data loss in the presence of a disk failure. For these multiple disk configurations, there is frequently a need for multiple controllers (in various configurations), multiple disk drives (with different capacities and different vendor or revision), and the need to swap devices and/or controllers in a disk array system in the event of up sizing storage capacity or replacing a failed device. In addition, there may be a desire to upgrade certain components with newer versions providing advanced features, but at the same time to retain other components for a reasonable lifetime. These issues create a need for some flexibility and adaptability in device-to-device communications, whether the devices are disk drives, other memory storage devices, disk drive controllers, host computer systems, communication systems, or the like.

Increasingly, a hardware device designed for one purpose could desirably be adopted for another purpose so as to maintain that device in the modified or upgraded system configuration, or to increase its capabilities on some manner. For example, in many commercial RAID storage systems, the SCA connector is standardized so as to permit interchangability in the industry between devices made by different manufacturers. This standardization may occasionally restrict the ability of a particular vendor from implementing proprietary structures or using proprietary methods in connection with the devices. In this event, the ability to configure a standard device or a connector associated with a standard device in a non-standard way is valuable. Providing an ability to use an existing connector having a limited number of wires for another purpose may also allow upgraded features to be provided without replacing hardware, for example, without replacing entire printed circuit boards.

Therefore there is a need for electrical cable adaptors and circuits that remap a connector and its associated signals to another signal set. As both DB-9 and RS-232 interfaces are in common use for communication among different computer components, there is a particular need for means that permits a single DB-9 connector and its associated signals to be remapped to provide a standard RS-232 interface, particularly as such communication applies to an interface to a RAID controller in a single RAID controller system, or to provide a controller-to-controller communications link for messaging, control and status signals between two RAID controllers in a dual-active system.

These and other features and advantages are provided by the inventive structure and method.

SUMMARY OF THE INVENTION

The invention provides structure, including circuits, cabling, and computer architecture, and method for permitting a single DB-9 connector and its associated signals to be remapped to provide a standard RS-232 interface, particularly as such communication applies to an interface to a RAID controller in a single RAID controller system,, and to provide a controller-to-controller communications link for messaging, control and status signals between two RAID controllers in a dual-active system. While specific circuit and cable implementation embodiments are disclosed, the inventive concept and method may be more widely applied to a variety of standard and non-standard interfaces.

BRIEF DESCRIPTION OF THE DRAWINGS

FIG. 8 is a diagrammatic illustration showing a DB-9 Interface Faceplate connector Pinout (Serial Channel A).

FIG. 9 is a diagrammatic illustration showing a diagnostic board DB9 terminal interface connector pinout (Serial Channel A).

FIG. 10 is a diagrammatic illustration showing one particular exemplary embodiment of DAC960SCA/SE packaging.

DETAILED DESCRIPTION OF EMBODIMENTS OF THE INVENTION

Figure 1:
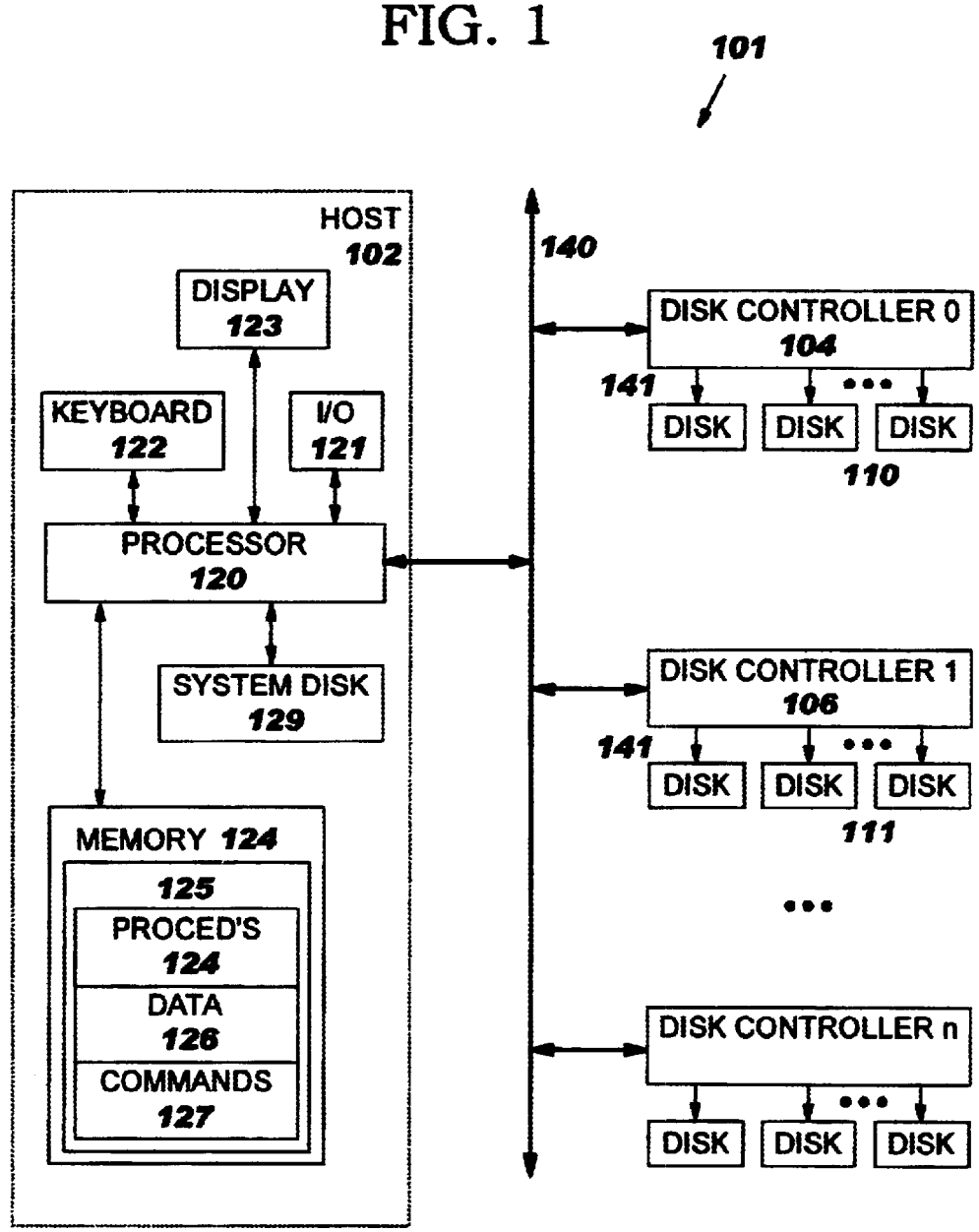
FIG. 1 is a diagrammatic illustration showing an exemplary embodiment of a computer system including disk controllers having procedures implemented in firmware, and with which the inventive structure and method may be practiced.

We now describe embodiments of the invention relative to the computer system illustrated in FIG. 1. An exemplary embodiment of the inventive computer system 101 including a host computer 102, one or more disk array controllers 104, 106, and arrays of disk drives 110, 111, each array including one or more individual disk drives is illustrated in FIG. 1. Host computer 102 includes a processor 120, input/output devices 121, such as a keyboard 122, display device 123, memory 124 coupled to the processor and having a defined data structure 125 for storing data 126, commands 127, and procedures 128; and a system disk drive 129. Other conventional computer system components may also be provided. The controller is coupled to the processor by a SCSI (Small Computer System Interface) bus or a Fibre Channel interface 140, and the disk drives are coupled to the controller by a SCSI bus or a Fibre Channel interface 141, in conventional manner. While we primarily refer to disk drives or hard disk drives in this description, it should be understood that the invention is applicable to many types of storage media, including but not limited to rotating magnetic disk drives, magneto-optical devices, readable/writable CD's, fixed or removable media, floppy disk drives, and even electronic or solid state storage media.

The disk drive arrays 110, 111 each include a plurality of disk drives, but the controller may be configured to control only a single disk drive or several drives. One or a plurality of disk controllers may generally be provided, although in presently implemented systems and in the embodiments illustrated and described herein, only one or two disk controllers are provided in the inventive system. Each array of disk drives is disposed in an enclosure as is commonly done for Redundant Array of Independent Disk (RAID) storage configurations.

This configuration has been provided to assist in an understanding of the invention. Those workers in the art will appreciate that various other computer systems or architectures may be used in conjunction with the inventive system and that the invention is not to be limited to use by or with the inventive structure or method.

We now turn our attention to hard disk drive controllers with which the invention is most closely, though not exclusively aligned. Some conventional disk array controllers, such as for example the DAC960SCA RAID disk array controller in a 3.5" half-height disk profile package, are designed to direct plug into a SCA disk slot and to match the hardware profiles and mounting points of a standard 3.5" half-height disk drive. (RAID refers to Redundant Array of Independent Disks, a firmware/hardware implementation of a disk array controller in which data is stored on disks in such a manner as to improve performance and avoid data loss in the presence of a disk failure.) The back of the controller assembly has a Single Connector Attachment (SCA) disk bus connector. The front of the controller assembly includes a 68-pin Differential SCSI host connection port, a RJ-45 Ethernet Port interface, and a DB-9 RS232 connector which has multiple purposes including field service maintenance access and controller-to-controller communications in dual-active implementations. (SCA refers to a standard disk drive connector that incorporates all power, I/O, and configuration connections into a single connector.)

Function or operation of a disk array controller are typically governed by the firmware resident in the controller. We consider two versions, using an examples for discussion two versions of disk array controllers made by Mylex Corporation (Facilities in Fremont, Calif., and Boulder, Colo.). The first version or configuration is referred to as the DAC960SCA version, and includes firmware that configures the controller to be a RAID disk array controller in which a SCSI connection is made to a host computer via the front panel Host SCSI connector, and the disk drives are controlled via the back-end SCA connector. In this first version of the controller the RJ-45 port is used to permit Ethernet access for controller configuration. (Ethernet in this description means for example any of the conventional ethernet protocols, including for example, 10BaseT, and 100BaseT/TX Ethernet.)

In a second version or configuration, referred to as the Charon version, the firmware configures the controller to be a Ethernet Port-to-SCA-SCSI disk array controller. (In this second version components may typically be depopulated from the controller to eliminate the expense of unneeded front panel Host SCSI connection.) These first and second versions are diagrammatically illustrated respectively in FIGS. 3/4 and 10.

We now describe the structure and operation of the DB-9 interface including circuit, cable, and firmware considerations. The DAC960 refers to the general series of RAID controller designs based on the i960 processor and made by Mylex Corporation of Fremont, Calif. The DAC960SF refers to a version of a high-performance controller family having two fibre host ports and six ultra-SCSI device ports (physical interfaces). The logical protocol used for both host and device communications is SCSI. This product includes "The Controller" and a "Fibre Daughterboard" plugged into the controller.

The DAC960SCA hardware design supports two serial asynchronous communication channels, Serial Channel A and Serial Channel B. The UART portion of the serial channels is implemented with the Phillips Semiconductor (Signetics), SCN2681 Dual UART component.

Both of the serial channel interfaces are capable of supporting several baud rates (for example, 38400, 19200, 9600, 4800, 1200, and 300 bps), 8 or 7 data bits, 1 or 2 stop bits, and either odd, even, or no parity. Firmware is responsible for setting defaults and handling configuration of the serial port parameters. Default settings are 9600 bps, 8 bits data, 2 stop bits, and no parity. The clock input to the SCN2681 Dual UART component is 3.6864 MHz. The 2681 must be programmed by firmware to set the desired baud rate based on this clock frequency.

In the Charon configuration, serial channel A supports Tx, Rx, CTS, RTS, DSR, DTR, and DCD. Serial channel A is available through a front faceplate male DB9 connector. The connector pin-out matches that of a terminal (DTE). If another terminal is connected to the DB-9 a null-modem device is required. All signals on serial channel A conform to EIA RS232 levels.

In the DAC960SCA configuration, the serial channel A configuration is dependent on the configuration of the controller. When the controller is configured to be a "simplex" controller, the DB-9 may only be used as a "3 wire" terminal interface—only the Tx, Rx, and ground pins are connected. When the controller is configured as a "dual-active" controller the DB-9 should only be connected via a special Dual-Active Cable or should be terminated with the DB-9 Plug device.

Dual-Active refers to the design for the system, including firmware design, in which two controllers can be used in such a way as both controllers have active host data connections to the disk drives, and both controllers are capable of taking over the host traffic operations of the other controller in event of a failure. This primarily applies to the DAC960SF firmware version of the controller.

Serial channel B supports only Tx and Rx. Serial channel B is available through an on-board header connector. Serial channel B is treated as if it were a terminal connection. All signals on serial channel B conform to EIA RS-232 levels.

Several configurations for Dual-Active Communications are now described in connection with the inventive structure and method. The signals and their descriptions are provided in the accompanying Tables 1–3, where Table 1 lists the Charon configuration serial channel A signal descriptions, Table 2 lists the DAC960SCA simplex configuration serial channel A signal descriptions, and Table 3 lists the DAC960SCA dual-active configuration serial channel A signal descriptions.

This section describes the theory of operations of dual-active communications as it relates to the inventive DB-9 circuitry implemented on the DAC960SCA for support of dual-active controller coordination. The DB-9 connector provides a standard RS-232 serial communications port in the Charon version of the controller, however, in the DAC960SCA version of the controller this port can act as a controller-to-controller communication path by utilizing an inventive circuit and cable called the "Dual-Active Cable". A controller configured by firmware for simplex operation can always use the DB-9 as a 3-wire interface for VT100 maintenance, but a controller configured for dual-active operation can only use the DB-9 port for controller-to-controller communication. Dual-active use of this port is the subject of this section.

One advantage of the inventive Dual-Active Cable, circuit, and controller-to-controller communication is to permit use and implementation of otherwise incompatible dual-controller firmware, such as dual-controller firmware designed for other platforms, on newer or updated platforms. For example, to permit firmware used on the predecessor DAC960SX platform to be used on the updated platform.

The inventive Dual-Active Circuit/Cable includes: (i) a bi-directional RS-232 serial communications path for controller-to controller ping messages; (ii) a pair of unidirectional "controller present" signals so that each controller can tell that the other controller is present and powered up; (iii) a pair of unidirectional "controller reset" signals so that each controller can hold the other in reset should that become necessary; (iv) a "cable present" indicator so that a controller can tell if the Dual-Active Circuit/Cable is connected, and used as a stop gate during the boot process to prevent a controller from booting in a system that already has a running controller without first coordinating the boot with that existing controller.

Circuitry to support controller-to-controller serial communication is implemented as follows: (1) The Dual-Active Cable implements a null-modem function such that the Tx pin on one controller is connected to the Rx pin on the other controller and vice-versa. (2) Standard UART serial communication processes can be used to send any message between the controllers. (3) If the cable is disconnected the UART receiver will see a continuous marking condition.

Circuitry to support the other-controller-present function is implemented as follows: (1) The Dual-Active Circuit/Cable connects the DTR output from one controller to the DSR input signal on the other controller, and vice-versa. (2) In the DAC960SCA configuration the DTR signal is hard-wired to a logic low, so that when the cable is connected and the controllers are powered up this causes the DSR signal to be a logic low, indicating to the receiving controller that the other controller is present and powered up. (3) If the cable is disconnected at either end, the RS-232 receiver will cause the DSR signal to go to a logic 1. (4) If the other controller is powered down the RS-232 receiver will cause the DSR signal to go to a logic 1. (5) A logic 1 on the DSR signal indicates to the receiving controller that either: (a) the cable is missing, or (b) the other controller is not present, or (c) the other controller is powered down, so that in these situation other signals can then be used to further diagnose the situation.

Circuitry to support the cable-present function is implemented as follows: (1) The Dual-Active Cable connects ground to pin 9 of the DB-9 connector, and this pin is then routed to the KBL_PRES* bit in the Dual UART Input Port Register. (2) If the KBL_PRES* bit is a logic 0, it indicates that the Dual-Active Cable is connected to the controller. Note that this KBL_PRES* bit only indicates if the cable is connected to the controller reading the KBL_PRES* bit, it does not indicate if the cable is connected to the other controller.

Circuitry to support the reset-other-controller function is implemented as follows: (1) The Dual-Active Cable connects the RTS output from one controller to the CTS input on the other controller, and vice-versa. (2) The CTS input is used as a reset input signal to the controller. Logic and firmware are implemented to prevent glitches on this signal from accidentally triggering a reset on the controller, where CTS at a logic low will reset the controller if certain other conditions are met. (3) If the cable is disconnected at either end, the RS-232 receiver will cause the CTS signal to go to a logic 1. (4) If the other controller is powered down the RS-232 receiver will cause the CTS signal to go to a logic 1. (5) A bit titled NRST_INH* is implemented in the Dual UART General Purpose Output Register which is used by firmware to mask the CTS reset signal, such that if RST_INH* is at a logic low, the CTS reset input will have no effect, and where the RST_INH* signal is set to a logic 1 by the PON* power-on reset signal so that the controller is sensitive to the CTS reset after power up. (6) The KBL_PRES* signal must indicate that a cable is present for the CTS reset to have any effect. (7) The RTS signal defaults to a logic 1 as a result of the PON* power-on reset signal when a controller powers up.

For the case where two controllers are connected by a Dual-Active Cable, the controllers are configured for dual-active operation, and power is applied, the interaction of firmware and hardware with regard to the controller-to-controller reset operates as follows: (1) Hardware on both controllers powers up to allow a CTS reset from the other controller. (2) One of the controllers will win the boot process and will assert RST_INH* to mask any reset from the other controller, and the boot winner then asserts CTS low to keep the other controller in reset. (3) At a point in time determined by firmware, the boot winner drives CTS high to allow the other controller to boot, and will de-assert RST_INH* so that a CTS reset can enter the controller from the other controller should that become necessary. (4) A controller will not boot if the KBL_PRES* bit is not at a logic 0.

For the case where two controllers are connected by a Dual-Active Cable, the controllers are configured for dual-active operation, and one of the controllers detects a fault on the other controller (such as a failure to respond to ping), operation is as follows: (1) The controller detecting the failure will first protect itself by asserting the RST_INH* signal, so that a surviving controller is protected from glitches and other signal aberrations that may occur as the failed controller is replaced or other maintenance actions are taken. (2) The controller detecting the failure will then hold the failed controller in reset by asserting the CTS signal low.

For the case where a controller is initially configured as a simplex controller, and then is configured for dual-active operation, and the user adds a second controller, operation is as follows: (1) In light of the fact that a controller configured for dual-active operation will not boot unless it detects the KBL_PRES* bit=0, a user may accomplish this either by attaching a Dual-Active Cable and letting the cable dangle from the DB-9 connector, or the user may attach a DB-9 Plug. (2) Once a dual-active capable controller boots in a simplex environment it will enter "survivor" mode, which mode will allow the controller to automatically initiate fail-back on insertion of a properly connected second controller. (3) Survivor mode also allows the user to remove the cable once the controller is booted, and the controller will continue operation (this is important to upgrade processes as noted in the next steps). (4) While in "survivor" mode, the controller asserts its RST_INH* signal to protect itself against CTS glitches that may occur during an upgrade, and asserts its RTS signal to make sure any second controller which is added will start out held in reset. (5) It is likely that users will have single controller situations that are later upgraded to dual-active situations, but those users will have installed a DB-9 Plug to avoid having a dangling cable, so that when ready to upgrade the user can remove the DB-9 Plug from the existing controller and attach one end of a Dual-Active Cable to the controller without shutting the system down. (6) The next step in a upgrade process is to attach the "hanging" end of the Dual-Active Cable to a second controller before inserting that controller into the backplane. (7) Once the cable is attached, the user inserts the second controller into the backplane, and the survivor will see the Controller Present indicator go active and will initiate the fail-back process to bring that controller on-line.

For the case where a controller is running in a dual-active pair but detects that Its cable has been removed, operation is as follows: (1) The controller will immediately shut down and allow the other controller to become the survivor. (2) A controller which is already a survivor will not shut down on detecting removal of the cable.

We now describe an embodiment of a circuit that allows a DB9 connector to be used by controller firmware in one of several configurations, including the three specific configurations described immediately below.

Figure 2:
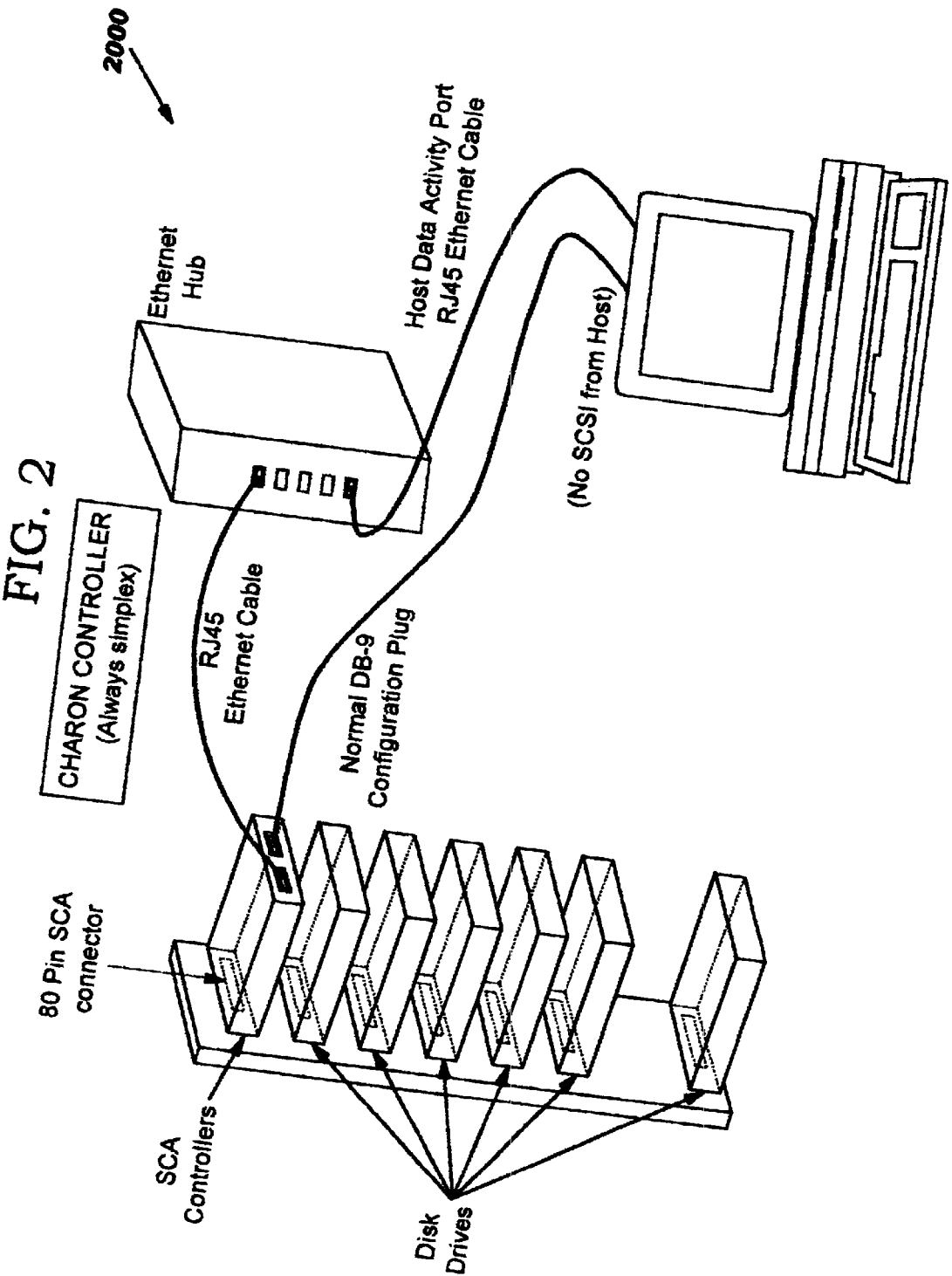
FIG. 2 is a diagrammatic illustration showing a first inventive configuration (Charon Configuration) that allows the inventive structure to be used by a controller and controller firmware.

In this first configuration, illustrated in FIG. 2, and referred to a mode 1, the DB9 connector provides a standard RS-232 interface with full modem control signaling available to the firmware. This connection is used by the firmware to provide a configuration and status interface to the user.

Figure 3:
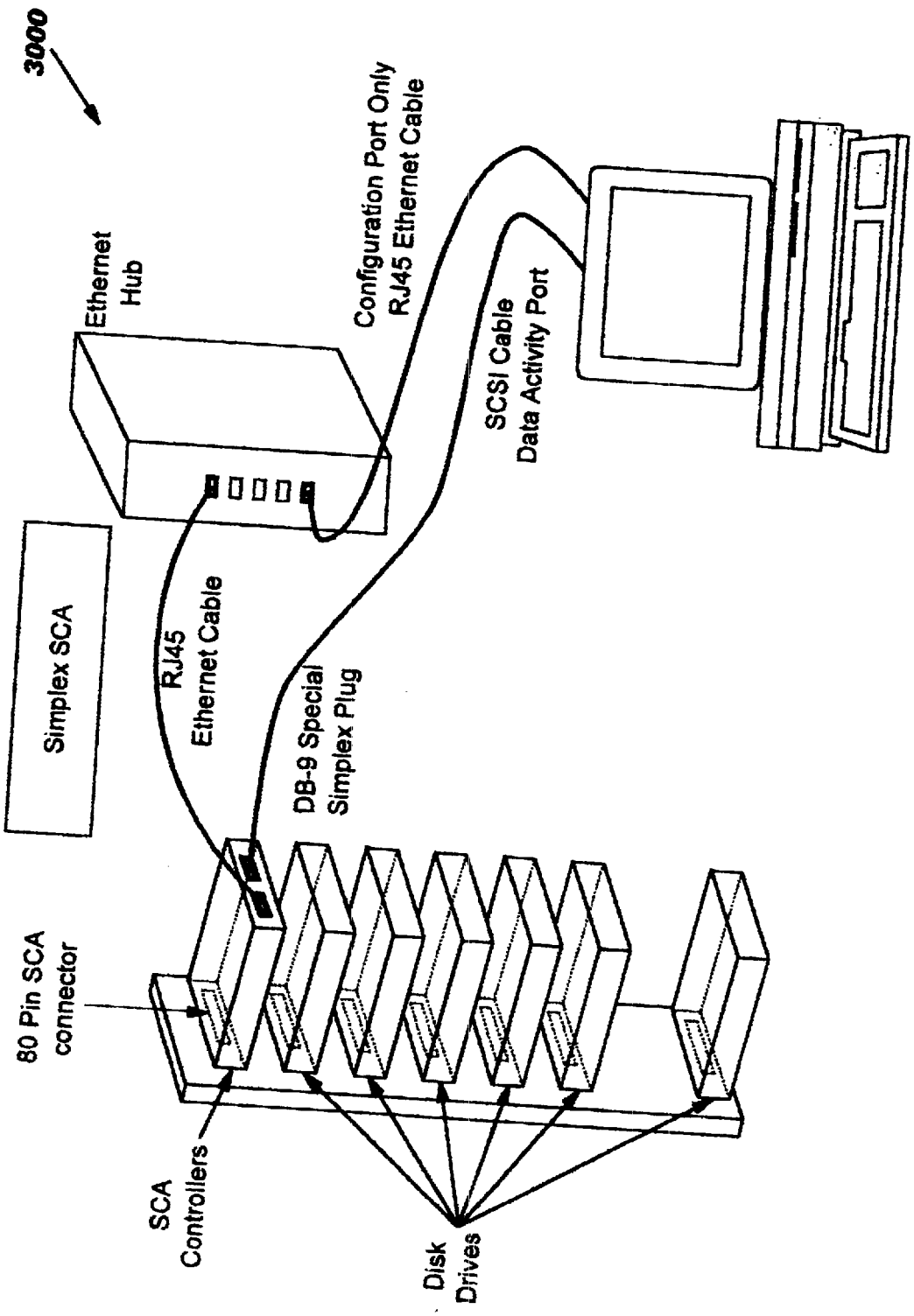
FIG. 3 is a diagrammatic illustration showing a second inventive configuration (Simplex SCA Configuration) that allows the inventive structure to be used by a controller and controller firmware.

The inventive structure and method may also be used with a second configuration, referred to as mode 2, having an SCA disk controller configured for simplex operation in the firmware. Ibis second configuration is illustrated in FIG. 3. Here, the DB9 connector provides a standard RS-232 interface, but full modem control signaling is not available to the firmware. This second embodiment of the DB9 connection is used by the firmware to provide a configuration and status interface to the user.

Figure 4:
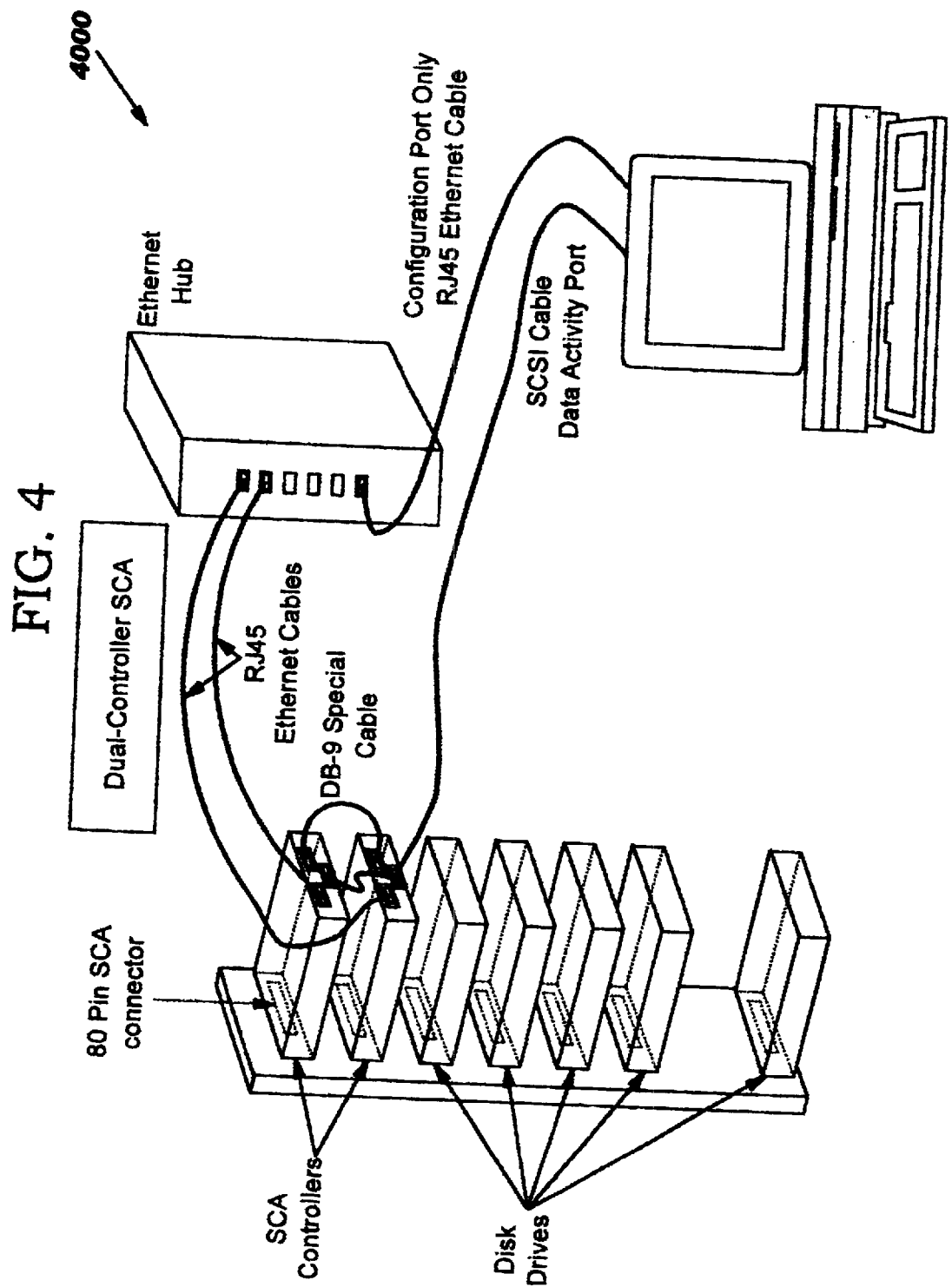
FIG. 4 is a diagrammatic illustration showing a third inventive configuration (Dual-Controller SCA Configuration) that allows the inventive structure to be used by a controller and controller firmware.

In FIG. 4 there is illustrated yet a third configuration, referred to as mode 3, and also involving an SCA controller, the SCA controller is configured for dual-active operation in the firmware. Here, the DB9 connector provides a sideband controller-controller communication path for messaging, control, and status indications when a special cable is used to interconnect the two controllers.

In the embodiments of the invention illustrated in the figures, it is noted that the mode of operation (mode 1 versus modes 2 or 3) may be selected by configuring a pair of load/no-load resistors (or jumpers). In addition, the mode 2 SCA simplex behavior versus the mode 3 SCA duplex behavior is selected by the firmware and the use of the special controller interconnect cable.

The inventive structure and method have several advantages and provide for flexible installation and configuration of devices and systems. Several specific implementation advantages are described below.

As a first example, in either an SCA or Charon configuration where the only available system connections are the SCSI port(s), and ethernet port (jack), and a single DB9 connector, the DB9 connector provides the RS-232 functionality as described.

In a second example, in either the Charon (mode 1) or simplex SCA (mode 2) there may be a needed for an RS-232 connection for initial user configuration interfaces, which can be provided for by the DB9 rather than, for example a DB25 connection.

In a third example, for the duplex SCA (mode 3) situation, there may be a need for a controller-controller communication path compatible with certain proprietary dual controller implementations (such as the made by Mylex (Fremont, Calif.) which provide for an RS-232 transmission and receipt of ASCII characters, an indication of controller presence, and a way to hold the other controller in hardware reset. The DB9 implemented RS-232 connection provides this capability.

As a fourth example, the inventive structure and method may be used to remap existing RS-232 signals where additional connectors are not available. For example, in the Mylex SX dual controller, the communication implementation uses a second RS-232 port for Tx/Rx and two discrete 5V signals for controller presence and partner reset. Because the Charon (mode 1) and simplex SCA (mode 2) needed to use a standard RS-232 connector and no other external connector was available, a new implementation which optionally remapped existing RS-232 modem control signals was needed. This DB9 configuration with remapped modem control signals provides the desired operation and function.

Figure 5:
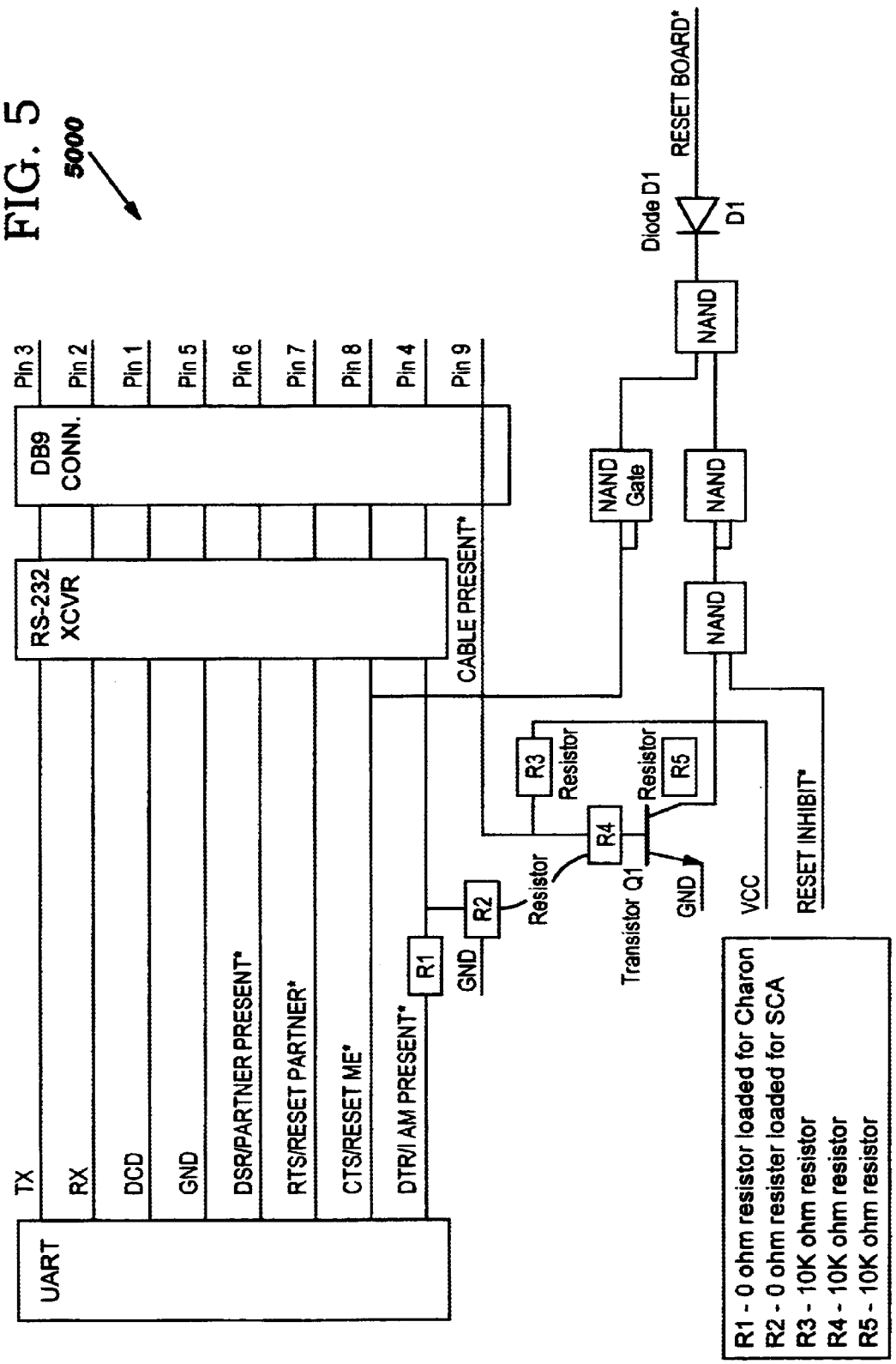
FIG. 5 is a diagrammatic illustration showing one particular exemplary embodiment of the inventive circuit including showing the positions and values of resistors which also act as switch elements.

One particular exemplary embodiment of the inventive circuit is illustrated in FIG. 5. In this circuit it may be observed that for the Charon (mode 1) configuration, resistor R1 is loaded, resistor R2 is not loaded and the DB9 connector presents a complete RS-232 interface including modem control signals.

In the SCA (mode 2) configuration, resistor R1 is not loaded and resistor R2 is loaded. In this case the DB9 connector can present a standard RS-232 interface (except for DTR,) or if the firmware is configured for dual-active controller operation and a special cable is attached, the DB9 connector presents an RS-232 RX/TX pair, cross-coupled 'partner present' signals, and cross coupled 'reset partner' signals. The special cable is a null-modem RS-232 cable modified by coupling pin 9 (normally a no-connect) with pin 5 (GND). The following table shows the pin connections of the special cable (conversion cable):

| A | Pin 1 | Pin 2 | Pin 3 | Pin 3 | Pin 5 | Pin 6 | Pin 7 | Pin 8 | Pin 9 |
|---|---|---|---|---|---|---|---|---|---|
| B | Pin 4 | Pin 3 | Pin 2 | Pins 6/1 | Pins 5/9 | Pin 4 | Pin 8 | Pin 7 | Pins 5/9 |

The special cable causes the I AM PRESENT* output signal on one controller to appear on the other controller's PARTNER PRESENT* input signal. Similarly, the RESET PARTNER* output signal on one controller appears on the other controller's RESET ME* input signal. The CABLE PRESENT* signal is pulled up on the controller and is only asserted (low) only when the special cable is attached to the DB9 connector because a standard RS-232 cable leaves pin 9 as a no connect, but the special cable connects it to pin 5 (GND).

Both the PARTNER PRESENT* and RESET ME* input signals are deasserted if there is nothing connected to the DB9 connector, or if the partner controller connected by the cable is powered off (this is a behavior of the RS-232 transceiver chip). The RESET INHIBIT* signal is a control bit used by the firmware to prevent any transient conditions on the RESET ME* signal from causing a RESET BOARD* assertion. The firmware asserts RESET INHIBIT* before asserting RESET PARTNER* when it determines that it is necessary to kill the partner controller.

Figure 6:
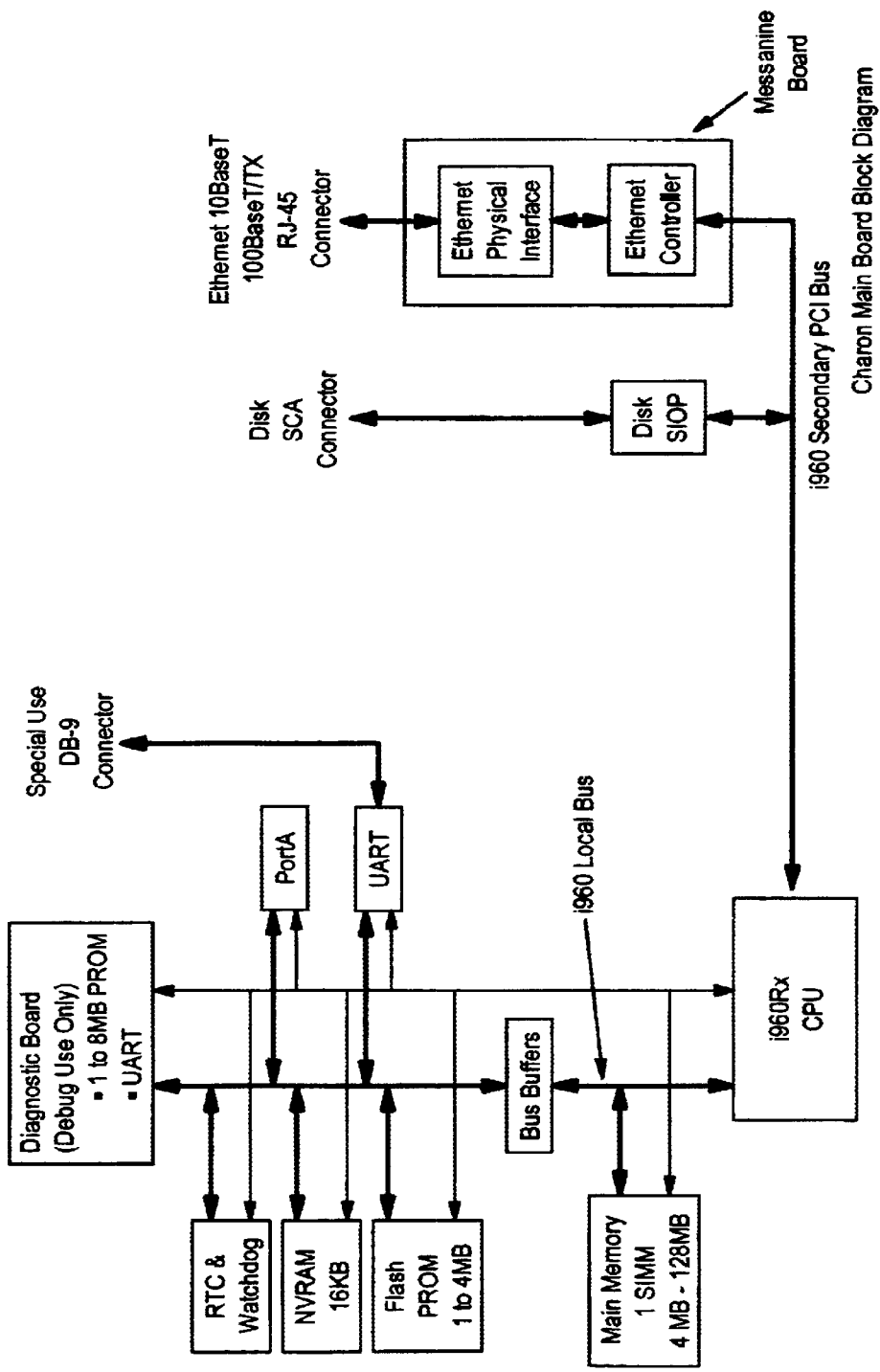
FIG. 6 is a diagrammatic illustration showing one particular exemplary embodiment of the Charon configuration main board block diagram.
Figure 7:
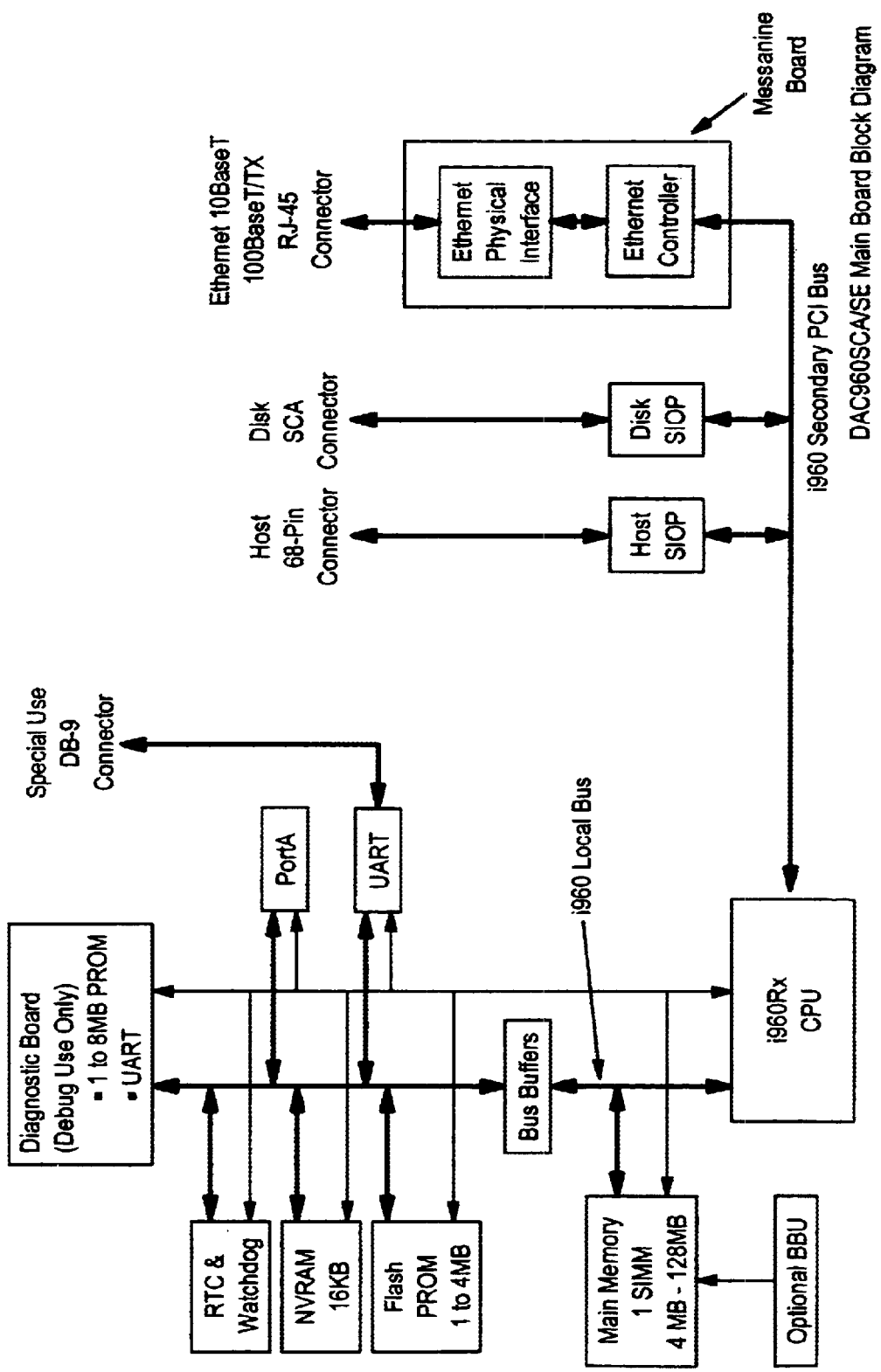
FIG. 7 is a diagrammatic illustration showing one particular exemplary embodiment of the DAC960SCA/SE configuration main board block diagram.

While the invention has been shown and described relative to the several figures already referred to in the text, several additional figures are also provided. With respect to FIG. 6 there is shown a diagrammatic illustration of one particular exemplary embodiment of the Charon configuration main board block diagram. With respect to FIG. 7 there is shown a diagrammatic illustration of one particular exemplary embodiment of the DAC960SCA/SE configuration main board block diagram. With respect to FIG. 8 there is shown a diagrammatic illustration of a DB-9 Interface Faceplate connector Pinout (Serial Channel A). With respect to FIG. 9 there is shown a diagrammatic illustration of a diagnostic board DB9 terminal interface connector pinout (Serial Channel A). With respect to FIG. 10 there is shown a diagrammatic illustration of one particular exemplary embodiment of DAC960SCA/SE packaging.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

TABLE 1

Charon configuration serial channel A signal descriptions.

| SIGNAL (Channel A) | Description | Comments |
|---|---|---|
| TXDA <output> | Serial Channel A Transmit Data | Transmit data output from the controller. |
| RXDA <input> | Serial Channel A Receive Data | Receive data input to the controller. |
| DSRA <input> | Serial Channel A Data Set Ready | |
| DTRA <output> | Serial Channel A Data Terminal Ready | |
| CTSA <input> | Serial Channel A Clear To Send | |
| RTSA <output> | Serial Channel A Request To Send | |
| DCDA <input> | Serial Channel A Data Carrier Detect | |
| KBL_PRES*<input> | Not connected | |
| Ground | Serial Channel A signal ground | |

TABLE 2

DAC960SCA simplex configuration serial channel A signal descriptions.

| SIGNAL (Channel A) | Description | Comments |
|---|---|---|
| TXDA <output> | Serial Channel A Transmit Data | Transmit data output from the controller. |
| RXDA <input> | Serial Channel A Receive Data | Receive data input to the controller. |
| DSRA <input> | Not connected | |
| DTRA <output> | Not connected | |
| CTSA <input> | Not connected | |
| RTSA <output> | Not connected | |
| DCDA <input> | Not connected | |
| KBL_PRES*<input> | Cable Present* (This signal may be left open if the user connects a terminal. It is recommended that a DB-9 Plug device be attached to the DB-9 connector as a default - this will help maintain compatibility with potential future firmware upgrades. Note that the DB9 Plug will ground pin 9.) | |
| Ground | Serial Channel A signal ground | |

TABLE 3

DAC960SCA dual-active configuration serial channel A signal descriptions.

| SIGNAL (Channel A) | Description | Comments |
|---|---|---|
| TXDA <output> | Serial Channel A Transmit Data | Transmit data output from the controller. |
| RXDA <input> | Serial Channel A Receive Data | Receive data input to the controller. |
| DSRA <input | Other controller present*. A logic low indicated that the other controller is present and has power. | |
| DTRA <output> | Other controller present*. Wired to the DSRA signal on the other controller. This signal is hard-wired to a logic low. | |
| CTSA <input> | Cross-coupled Reset*. This signal comes from the other controller and is used as a hardware reset input to this controller. | |

TABLE 3-continued

DAC960SCA dual-active configuration serial channel A signal descriptions.

| SIGNAL (Channel A) | Description | Comments |
|---|---|---|
| RTSA <output> | Reset other controller*. Wired to the CTSA signal on the other controller. | |
| DCDA <input> | Not connected | |
| KBL_PRES* <input> | Cable Present* This signal must be grounded to allow a controller configured for dual-active operation to boot. The Dual-Active Cable and the DB-9 Plug device will ground this pin. This pin is used by the controller to detect the presence of the Dual-Active Cable. | |
| Ground | Serial Channel A signal ground | |

We claim:

1. A method for operating a first RAID storage controller to reset a second RAID storage controller, said first controller having a first connector, said second controller having a second connector, said first and second controllers communicating with each other using RS-232 protocol via said first and second connectors and a cable, each of said connectors having eight pins to handle RS-232 protocol and an additional, ninth pin, said method comprising the steps of:

said second controller sending a cable present signal to said first controller via said ninth pin of each of said connectors and said cable when said cable is present between said first and second controllers;

said first controller pinging said second controller to determine, by an appropriate response from said second controller or lack of said appropriate response, whether or not said second controller is able to communicate with said first controller; and if said appropriate response is not received by said first controller from said second controller and if said cable present signal is being received by said first controller from said second controller, said first controller sending a reset signal to said second controller.

2. A method as set forth in claim 1 wherein said cable has at least nine conductors, one of said conductors for each of the pins of said connectors, and said RS-232 protocol utilizes only eight of said conductors.

3. A method as set forth in claim 2 where said reset signal is sent on a different conductor than said cable present signal and said pinging.

4. A method as set forth in claim 1 wherein said second controller, when present, sends a controller present signal to said first controller via respective pins of said connectors and said cable, and before said pinging step and said reset signal sending step, said first controller determines if said second controller is present by checking for said controller present signal.

5. A method as set forth in claim 1 wherein said second controller is only reset if said second cable concurrently receives a cable present signal and said reset signal from said second controller.

6. A method as set forth in claim 1 further comprising a first UART interposed between said first connector and said first controller, and a second UART interposed between said second connector and said second controller, said first UART having only eight active pins on one side to support said RS-232 protocol and said second UART having only eight active pins on one side to support said RS-232 protocol.

7. A method as set forth in claim 1 wherein said second controller generates a reset inhibit signal for said second controller to counteract said reset controller signal sent by said first controller.

8. A method as set forth in claim 1 wherein said ninth pin of each of said connectors is not involved with said RS-232 protocol.

9. A method as set forth in claim 1 wherein each of said connectors is a DB9 connector.

10. A storage controller system comprising:

a first storage controller having a first connector;

a second storage controller having a second connector, said first and second controllers communicating with each other using RS-232 protocol via said first and second connectors and a cable, each of said connectors having eight pins to handle RS-232 protocol and an additional, ninth pin;

said second controller includes circuitry to send a cable present signal to said first controller via said ninth pin of each of said connectors and said cable when said cable is present between said first and second controllers;

said first controller includes programming to ping said second controller to determine, by an appropriate response from said second controller or lack of said appropriate response, whether or not said second controller is able to communicate with said first controller; and if said appropriate response is not received by said first controller from said second controller and if said cable present signal is being received by said first controller from said second controller, said first controller includes circuitry to send a reset signal to said second controller.

11. A system as set forth in claim 10 wherein said cable has at least nine conductors, one of said conductors for each of the pins of said connectors, and said RS-232 protocol utilizes only eight of said conductors.

12. A system as set forth in claim 11 where said reset signal is sent on a different conductor than said cable present signal and said pinging.

13. A system as set forth in claim 10 wherein said second controller, when present, sends a controller present signal to said first controller via respective pins of said connectors and said cable, and before said pinging and sending said reset signal, said first controller includes circuitry to determine if said second controller is present by checking for said controller present signal.

14. A system as set forth in claim 10 wherein said second controller is only reset if said second cable concurrently receives a cable present signal and said reset signal from said second controller.

15. A system as set forth in claim 10 further comprising a first UART interposed between said first connector and said first controller, and a second UART interposed between said second connector and said second controller, said first UART having only eight active pins on one side to support said RS-232 protocol and said second UART having only eight active pins on one side to support said RS-232 protocol.

16. A system as set forth in claim 10 wherein said second controller includes circuitry to generate a reset inhibit signal for said second controller to counteract said reset controller signal sent by said first controller.

17. A system as set forth in claim 10 wherein said ninth pin of each of said connectors is not involved with said RS-232 protocol.

18. A system as set forth in claim 10 wherein each of said connectors is a DB9 connector.

19. A computer program product for operating a first RAID storage controller to reset a second RAID storage controller, said first controller having a first connector, said second controller having a second connector, said first and second controllers communicating with each other using RS-232 protocol via said first and second connectors and a cable, each of said connectors having eight pins to handle RS-232 protocol and an additional, ninth pin, said computer program product comprising:

a computer readable medium;

first program instructions in said first controller to process a cable present signal received from said second controller via said ninth pin of each of said connectors and said cable when said cable is present between said first and second controllers;

second program instructions in said first controller to ping said second controller to determine, by an appropriate response from said second controller or lack of said appropriate response, whether or not said second controller is able to communicate with said first controller; and if said appropriate response is not received by said first controller from said second controller and if said cable present signal is being received by said first controller from said second controller, third program instructions in said first controller to initiate a reset signal to said second controller; and wherein said first, second and third program instructions are recorded on said medium.

20. A computer program product as set forth in claim 19 further comprising fourth program instructions in said first controller to process a controller present signal receive from said second controller, when present and connected to said cable, and before said second program instructions ping said second controller and said third program instructions send said reset signal, fifth program instructions in said first controller to determine if said second controller is present by checking for said controller present signal; and wherein said fourth and fifth program instructions are recorded on said medium.

* * * * *